July 8, 1952
A. J. IRVING
2,602,233
MEASURING LINE
Filed July 13, 1950
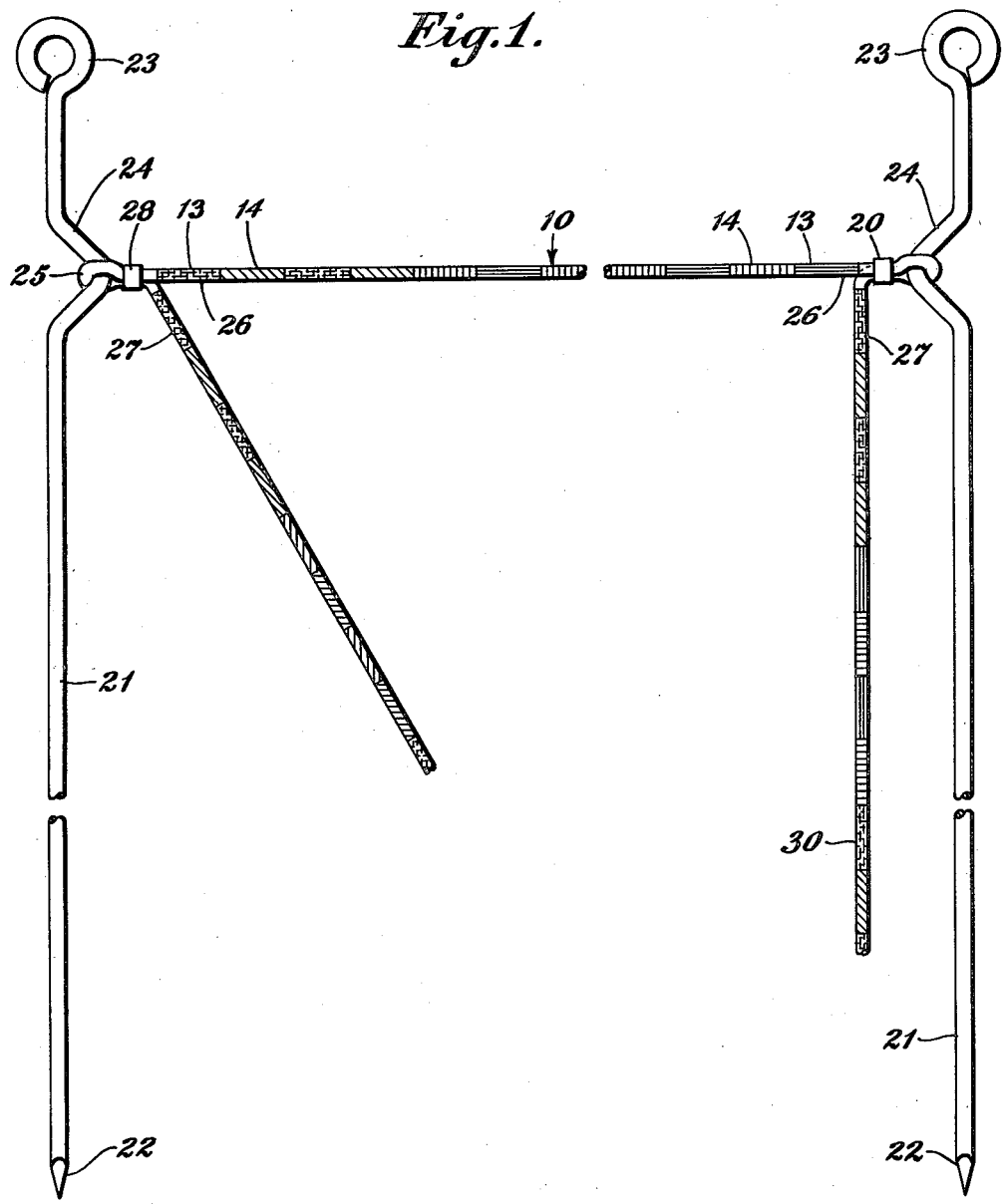
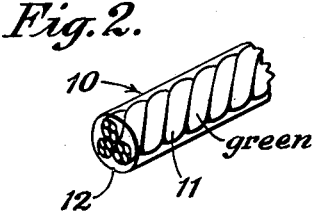
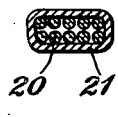
INVENTOR.
Albert J. Irving
BY
Dale A. Bauer
ATTORNEY Patented July 8, 1952

2,602,233

UNITED STATES PATENT OFFICE 2,602,233

MEASURING LINE

Albert J. Irving, Brewster, N. Y., assignor to Permark Company, Inc., New York, N. Y., a corporation of New York Application July 13, 1950, Serial No. 173,618

3 Claims. (Cl. 33—137)

This invention relates primarily to gardening. It has particular relation to the proper spacing of plants in small gardens.

In large scale farming operations where mechanical planters are employed which accurately space the rows of plants, the number of seeds planted, and the distance between plants, it is possible to take the utmost advantage of the soil available so that each plant has adequate room to grow but no space is wasted. In small gardens and flower beds where mechanical machines cannot be employed or are of such constriction as to be of minor efficiency this is not possible, rows straggle and planting in the rows is irregular, in some areas plants are crowded and in others soil is wasted.

It is an object of this invention to prepare a measuring device which will make it possible for the gardener to space his plants, bulbs or seeds accurately both lengthwise and across his garden and which can be readily shifted as the planting progresses.

Another object of the invention is to overcome the difficulty which has attended the use of prior art tapes and cords. Such lines became tangled, broken, dirty and unsightly, and markings were easily defaced and after a short period they passed out of use.

This invention overcomes all these objections as my measuring line can be readily washed off or otherwise cleaned and its indicia of measurement are permanent and of high visibility and it does not tangle.

Another object of the invention is to provide the gardener with accurate spacing along his rows and accurate spacing between his rows.

The objects of the invention are accomplished by a device which in a preferred and detailed form includes a measuring line adapted for use in gardens including a flexible cord divided by visible indicia into major units of length, and subdivided into minor units of length, adjacent minor units of length being wholly and differently colored, said divided and colored cord being sheathed in flexible, transparent plastic, having loose ends and being attached at spaced points intermediate its ends to stakes having abutments between which the cord may be wound.

The preferred form of the invention is illustrated in the accompanying drawing in which, Fig. 1 is an elevational view of the device as a whole;

Fig. 2 is a section enlarged and diagrammatic through the cord; and

Fig. 3 is a diagrammatic section through the end of a woven tape similarly colored and similarly coated.

Referring to the numerals in Figures 1 and 2, 10 indicates a cord of twisted cotton or rayon coated with transparent plastic. In Figure 2, the numeral 11 indicates the cord and the numeral 12 the plastic coating. Each three inches of the line 10 is colored so that the line is divided into units. I may use minor units of three inches and may indicate major divisions in the following way: The first minor unit is numbered 13 and is colored green. The second unit 14 is colored yellow. If it is desired to have the major divisions equal a foot the green and yellow coloring ends establish four minor units and are replaced with red and blue for four alternate units, changing back again to green and yellow at the junction of the next major unit.

If it is not desired to use more than two colors major units may be indicated by black bands or other separations.

The coloring of the cord may be accomplished by dyeing, preferably with colors that are not fugitive to light. The technique of dyeing portions of materials in different colors with accurate division lines is known. After the cord is thus made up it is covered with a plastic substance which is preferably transparent so that the colors of the cord can be seen through it. Methods of coating wire and cord with plastic are known and such methods will be employed in this instance. Coating materials for this use are also known and include vinyl resins, cellulosic resins and formaldehyde resins, to mention only a few. The plastic coat need not be thick but may be thin. The process of impregnation may also be employed so long as the fibers are coated with a continuous cover which excludes dirt and moisture.

If desired, as shown in Figure 3, a flat tape, made of woven strands 20 and coated with plastic as aforesaid may be employed, a similar color scheme being preferably employed to indicate divisions and subdivisions.

When the measuring line is completed it may be cut into suitable lengths and attached to stakes 21 which may conveniently be made of heavy wire pointed at one end 22 and having the other end 23 shaped as a handle for pressing into the ground and removable. Intermediate the ends the stakes may have offset portions 24 which provide abutments to limit the penetration of the stake into the ground, as points of attachment for the line, and as abutments for handle 23 between which the line may be wound when not in use. The line is preferably attached to the stakes by passing it around the stake as at 25 and clipping the standing part 26 to the loose end 27 by a metal clip 28 such as a heavy Hotchkiss or Bostitch staple.

The loose ends 27, 30 are long enough to be laid along the ground and to serve as guides for the space of the plants in the rows.

In employing the invention the gardener unwinds the measuring line from the stakes and thrusts the latter into the ground at the head of the garden, the line being brought taut between them. He lays the loose ends out at right angles to the line between the stakes, selects a division of the standing part for the head of the row and a division of the loose end for the location of the plant in the row and proceeds to plant until that portion of the garden bounded by the line has been planted. Then he shifts the stakes and commences the planting of a new section. In this way, the entire garden may be planted with an accuracy which is highly beneficial to the plants, improves the appearance of the garden, prevents crowding and other forms of inefficient spacing and lightens the gardener's labors. Rows need not be perpendicular to the standing part but may be planted at any angle thereto by simple arrangement of the loose ends in parallel to each other and at a selected angle to the standing part. In this way patterns may be accurately placed in gardens with a minimum of preliminary layout work.

As many apparently widely different embodiments of the present invention may be made without departing from the spirit and scope thereon, it is to be understood that the invention is not limited to the specific embodiments.

What is claimed is:

1. A measuring and aligning device adapted for use in laying out gardens, including a flexible cord divided by visible indicia into major units of length and sub-divided into minor units of length, adjacent minor units of length being wholly and differently colored, said divided and colored cord being sheathed in flexible transparent plastic, and a pair of stakes, each of which is deformed at one end to form a handle and at a point intermediate its ends to form a notched abutment, said sheathed cord being secured at spaced points intermediate its ends to said abutments whereby the loose ends of the cord are available to be stretched at an angle to the tautened central portion of the cord between the stakes when the latter are embedded in the ground.

2. A device as defined in claim 1 wherein each stake extends through a bight in said cord and adjacent parts of the cord are clamped together by a metal band to form said bight.

3. A device as defined in claim 1 wherein each stake is constituted by a single piece of stiff metallic wire bent to form said handle and abutment.

ALBERT J. IRVING.

REFERENCES CITED

The following references are of record in the file of this patent:

UNITED STATES PATENTS

| Number | Name | Date |
|---|---|---|
| 603,157 | Spitzenberg | Apr. 26, 1898 |
| 1,982,304 | Holden | Nov. 27, 1934 |
| 2,382,355 | Warren | Aug. 14, 1945 |
| 2,448,847 | Van Dyke et al. | Sept. 7, 1948 |
| 2,523,255 | Coleman | Sept. 19, 1950 |